US012775085B2

(12) United States Patent
Davis et al.

(10) Patent No.: US 12,775,085 B2
(45) Date of Patent: Oct. 27, 2026

(54) POSITION TRACKING USING OVERHEAD AIRCRAFT

(71) Applicant: Torc Robotics, Inc., Blacksburg, VA (US)

(72) Inventors: William Gray Davis, Austin, TX (US); Akshay Pai Raikar, Austin, TX (US); Joseph R. Fox-Rabinovitz, Austin, TX (US)

(73) Assignee: Torc Robotics, Inc., Blacksburg, VA (US)

( * ) Notice: Subject to any disclaimer, the term of this patent is extended or adjusted under 35 U.S.C. 154(b) by 189 days.

(21) Appl. No.: 18/927,491

(22) Filed: Oct. 25, 2024

(65) Prior Publication Data

US 2026/0118498 A1 Apr. 30, 2026

(51) Int. Cl.
*G01S 13/62* (2006.01)
*G01S 13/46* (2006.01)

(52) U.S. Cl.
CPC .............. *G01S 13/62* (2013.01); *G01S 13/46* (2013.01); *G01S 2013/468* (2013.01)

(58) Field of Classification Search
CPC ..... G01S 13/62; G01S 13/46; G01S 2013/468
See application file for complete search history.

(56) References Cited

U.S. PATENT DOCUMENTS 5,448,243 A * 9/1995 Bethke .................... G01S 13/87 342/36
9,311,821 B2 * 4/2016 Melum .................... G08G 5/22
11,158,198 B1 * 10/2021 Beard ..................... G01S 19/14
11,327,179 B2 5/2022 McKeown et al.
2025/0342767 A1 * 11/2025 Swinsburg .............. G08G 5/54

* cited by examiner

*Primary Examiner* — Nazra Nur Waheed
(74) *Attorney, Agent, or Firm* — McCarter & English, LLP

(57) ABSTRACT

A system for localization of an autonomous vehicle includes a plurality of radio receivers configured to receive automatic dependent surveillance-broadcast (ADS-B) radio signals transmitted by a plurality of overhead aircraft, and at least one processor coupled to at least one memory and configured to perform operations comprising: based upon a first, a second, and a third ADS-B radio signals transmitted by a first, a second, and a third overhead aircraft, respectively, computing an angle from, and a distance between, a radio receiver to a respective overhead aircraft, and computing a relative motion of the respective overhead aircraft; and based upon position information included in the first, second, and third ADS-B radio signals, and using the first angle, second angle, third angle, first distance, second distance, third distance, the relative motion of each of the first, second, and third overhead aircraft, performing multilateration to determine a position of the autonomous vehicle.

20 Claims, 5 Drawing Sheets

POSITION TRACKING USING OVERHEAD AIRCRAFT

TECHNICAL FIELD

The field of the disclosure relates generally to mapping and localization of a vehicle, more specifically, mapping and localization of an autonomous vehicle using automatic dependent surveillance-broadcast (ADS-B).

BACKGROUND OF THE INVENTION

Autonomous vehicles employ fundamental technologies such as, perception, localization, behaviors and planning, and control. Perception technologies enable an autonomous vehicle to sense and process its environment. Perception technologies process a sensed environment to identify and classify objects, or groups of objects, in the environment, for example, pedestrians, vehicles, or debris. Localization technologies determine, based on the sensed environment, for example, where in the world, or on a map, the autonomous vehicle is. Localization technologies process features in the sensed environment to correlate, or register, those features to known features on a map. Localization technologies may rely on inertial navigation system (INS) data. Behaviors and planning technologies determine how to move through the sensed environment to reach a planned destination. Behaviors and planning technologies process data representing the sensed environment and localization or mapping data to plan maneuvers and routes to reach the planned destination for execution by a controller or a control module. Controller technologies use control theory to determine how to translate desired behaviors and trajectories into actions undertaken by the vehicle through its dynamic mechanical components. This includes steering, braking and acceleration.

Localization technologies rely on perception data collected using light detection and ranging (LiDAR) sensors, radio detection and ranging (RADAR) sensors, or cameras to determine a current location of the autonomous vehicle. Performance and accuracy of the LiDAR sensors, RADAR sensors, or cameras vary with weather conditions, and fog, rain, poor lighting conditions, or extreme low temperature conditions adversely affect performance and accuracy of these sensors. Additionally, localization based upon GNSS depends on visibility of a global navigation satellite system (GNSS) and satellite-based augmentation system (SBAS) satellites. Localization using global positioning satellite (GPS) signal can be unreliable due to shadowing and multipath errors.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY OF THE INVENTION

In one aspect, a system for localization of an autonomous vehicle is disclosed. The system includes a plurality of radio receivers configured to receive automatic dependent surveillance-broadcast (ADS-B) radio signals transmitted by a plurality of overhead aircraft, at least one memory configured to store instructions, and at least one processor communicatively coupled to the at least one memory. The at least one processor is configured to execute the stored instructions to perform operations including: (i) based upon a first ADS-B radio signal transmitted by a first overhead aircraft of the plurality of overhead aircraft, (a) computing a first angle from a radio receiver of the plurality of radio receivers to the first overhead aircraft, (b) computing a first distance between the radio receiver and the first overhead aircraft, and (c) computing a relative motion of the first overhead aircraft; (ii) based upon a second ADS-B radio signal transmitted by a second overhead aircraft of the plurality of overhead aircraft, (a) computing a second angle from the radio receiver of the plurality of radio receivers to the second overhead aircraft, (b) computing a second distance between the radio receiver and the second overhead aircraft, and (c) computing a relative motion of the second overhead aircraft; (iii) based upon a third ADS-B radio signal transmitted by a third overhead aircraft of the plurality of overhead aircraft, (a) computing a third angle from the radio receiver of the plurality of radio receivers to the second overhead aircraft, (b) computing a third distance between the radio receiver and the second overhead aircraft, and (c) computing a relative motion of the third overhead aircraft; and (iv) based upon position information included in the first, second, and third ADS-B radio signals, and using the first angle, second angle, third angle, first distance, second distance, third distance, the relative motion of the first overhead aircraft, the relative motion of the second overhead aircraft, and the relative motion of the third overhead aircraft, performing multilateration to determine a position of the autonomous vehicle. The plurality of radio receivers is positioned on a body of the autonomous vehicle.

In another aspect, a computer-implemented method for localization of an autonomous vehicle is disclosed. The autonomous vehicle includes a plurality of radio receivers configured to receive automatic dependent surveillance-broadcast (ADS-B) radio signals transmitted by a plurality of overhead aircraft. The computer-implemented method includes (i) based upon a first ADS-B radio signal transmitted by a first overhead aircraft of the plurality of overhead aircraft, (a) computing a first angle from a radio receiver of the plurality of radio receivers to the first overhead aircraft, (b) computing a first distance between the radio receiver and the first overhead aircraft, and (c) computing a relative motion of the first overhead aircraft; (ii) based upon a second ADS-B radio signal transmitted by a second overhead aircraft of the plurality of overhead aircraft, (a) computing a second angle from the radio receiver of the plurality of radio receivers to the second overhead aircraft, (b) computing a second distance between the radio receiver and the second overhead aircraft, and (c) computing a relative motion of the second overhead aircraft; (iii) based upon a third ADS-B radio signal transmitted by a third overhead aircraft of the plurality of overhead aircraft, (a) computing a third angle from the radio receiver of the plurality of radio receivers to the second overhead aircraft, (b) computing a third distance between the radio receiver and the second overhead aircraft, and (c) computing a relative motion of the third overhead aircraft; and (iv) based upon position information included in the first, second, and third ADS-B radio signals, and using the first angle, second angle, third angle, first distance, second distance, third distance, the relative motion of the first overhead aircraft, the relative motion of the second overhead aircraft, and the relative motion of the third overhead aircraft, performing multilateration to determine a position of the autonomous vehicle.

In yet another aspect, an autonomous vehicle is disclosed. The autonomous vehicle includes a plurality of radio receivers configured to receive automatic dependent surveillance-broadcast (ADS-B) radio signals transmitted by a plurality of overhead aircraft, at least one memory configured to store instructions, and at least one processor communicatively coupled to the at least one memory. The at least one processor is configured to execute the stored instructions to perform operations including: (i) based upon a first ADS-B radio signal transmitted by a first overhead aircraft of the plurality of overhead aircraft, (a) computing a first angle from a radio receiver of the plurality of radio receivers to the first overhead aircraft, (b) computing a first distance between the radio receiver and the first overhead aircraft, and (c) computing a relative motion of the first overhead aircraft; (ii) based upon a second ADS-B radio signal transmitted by a second overhead aircraft of the plurality of overhead aircraft, (a) computing a second angle from the radio receiver of the plurality of radio receivers to the second overhead aircraft, (b) computing a second distance between the radio receiver and the second overhead aircraft, and (c) computing a relative motion of the second overhead aircraft; (iii) based upon a third ADS-B radio signal transmitted by a third overhead aircraft of the plurality of overhead aircraft, (a) computing a third angle from the radio receiver of the plurality of radio receivers to the second overhead aircraft, (b) computing a third distance between the radio receiver and the second overhead aircraft, and (c) computing a relative motion of the third overhead aircraft; and (iv) based upon position information included in the first, second, and third ADS-B radio signals, and using the first angle, second angle, third angle, first distance, second distance, third distance, the relative motion of the first overhead aircraft, the relative motion of the second overhead aircraft, and the relative motion of the third overhead aircraft, performing multilateration to determine a position of the autonomous vehicle.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

Figure 1:
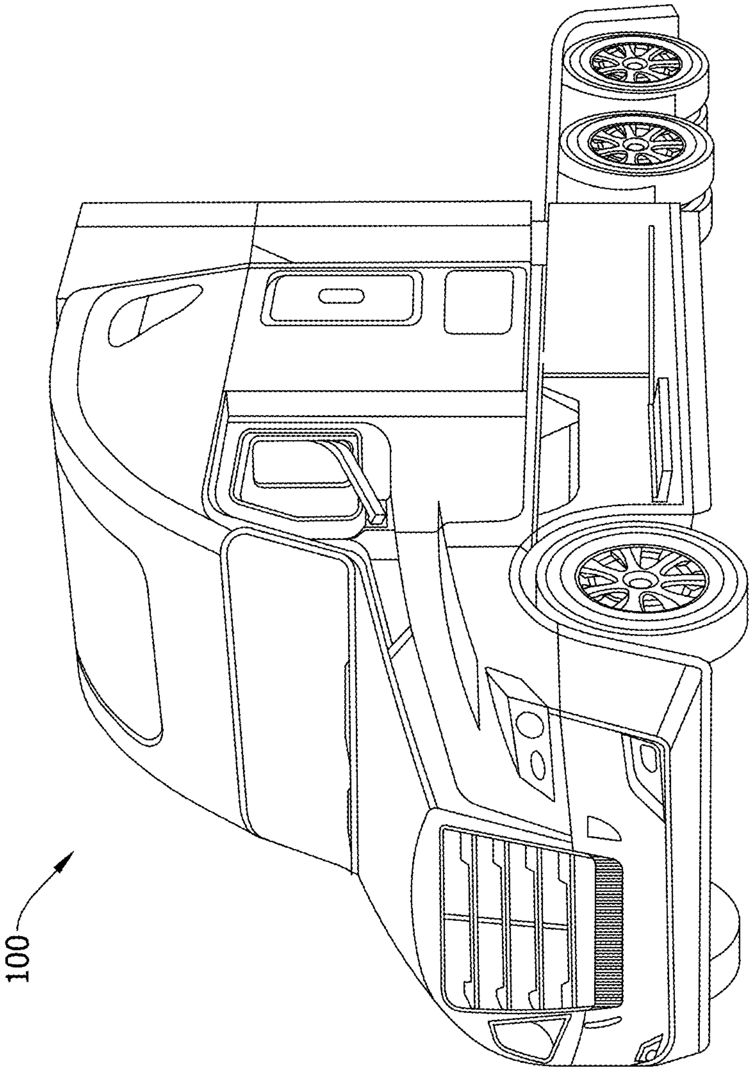
FIG. 1. is a schematic view of an autonomous truck.

Corresponding reference characters indicate corresponding parts throughout the several views of the drawings. Although specific features of various examples may be shown in some drawings and not in others, this is for convenience only. Any feature of any drawing may be referenced or claimed in combination with any feature of any other drawing.

Some structural or method features may be shown in specific arrangements and/or orderings in the drawings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments, and, in some embodiments, it may not be included or may be combined with other features.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure.

As described herein, localization is critical for an autonomous vehicle to operate, and there are certain drawbacks corresponding to various known localization techniques. Disclosed herein are solutions to the drawbacks of known localization techniques. Embodiments, in the present disclosure, describe using Automatic Dependent Surveillance-Broadcast (ADS-B) radio signals with tracking information for localization of the autonomous vehicle, including using the ADS-B signals transmitted by aircraft passing overhead as localization input data.

One or more of the following terms may be used in the disclosure, and their definition is provided below.

An autonomous vehicle: An autonomous vehicle is a vehicle that is able to operate itself to perform various operations such as controlling or regulating acceleration, braking, steering wheel positioning, and so on, without any human intervention. An autonomous vehicle has an autonomy level of level-4 or level-5 recognized by National Highway Traffic Safety Administration (NHTSA).

A semi-autonomous vehicle: A semi-autonomous vehicle is a vehicle that is able to perform some of the driving related operations such as keeping the vehicle in lane and/or parking the vehicle without human intervention. A semi-autonomous vehicle has an autonomy level of level-1, level-2, or level-3 recognized by NHTSA.

A non-autonomous vehicle: A non-autonomous vehicle is a vehicle that is neither an autonomous vehicle nor a semi-autonomous vehicle. A non-autonomous vehicle has an autonomy level of level-0 recognized by NHTSA.

Automatic dependent surveillance-broadcast (ADS-B): ADS-B is an aviation surveillance technology and form of electronic conspicuity in which an aircraft determines its position via satellite navigation or other sensors and periodically broadcasts its position and other related data, enabling it to be tracked. The information can be received by radio receivers. The ADS-B is a radio signal, and the ADS-B radio signal broadcasted by an aircraft is referenced as an ADS-B out.

Multilateration: Multilateration (MLat) is a technique known in navigation and surveillance applications and uses Time Difference of Arrival (TDOA) for localization based upon a radio signal emitted by a mobile user and received by a plurality of fixed receivers, or radio signals emitted by a plurality of fixed transmitters received by the mobile user.

FIG. 1 illustrates a vehicle 100, such as a truck that may be conventionally connected to a single or tandem trailer to transport the trailer (not shown in FIG. 1) to a desired location. The vehicle 100 includes a cabin that can be supported by, and steered in the required direction, by front wheels and rear wheels that are partially shown in FIG. 1. Front wheels are positioned by a steering system that includes a steering wheel and a steering column (not shown in FIG. 1). The steering wheel and the steering column may be located in the interior of the cabin.

The vehicle 100 may be an autonomous vehicle, in which case the vehicle 100 may omit the steering wheel and the steering column to steer the vehicle 100. Rather, the vehicle 100 may be operated by an autonomy computing system (not shown in FIG. 1) of the vehicle 100 based on data collected by a sensor network (not shown in FIG. 1) including one or more sensors.

Figure 2:
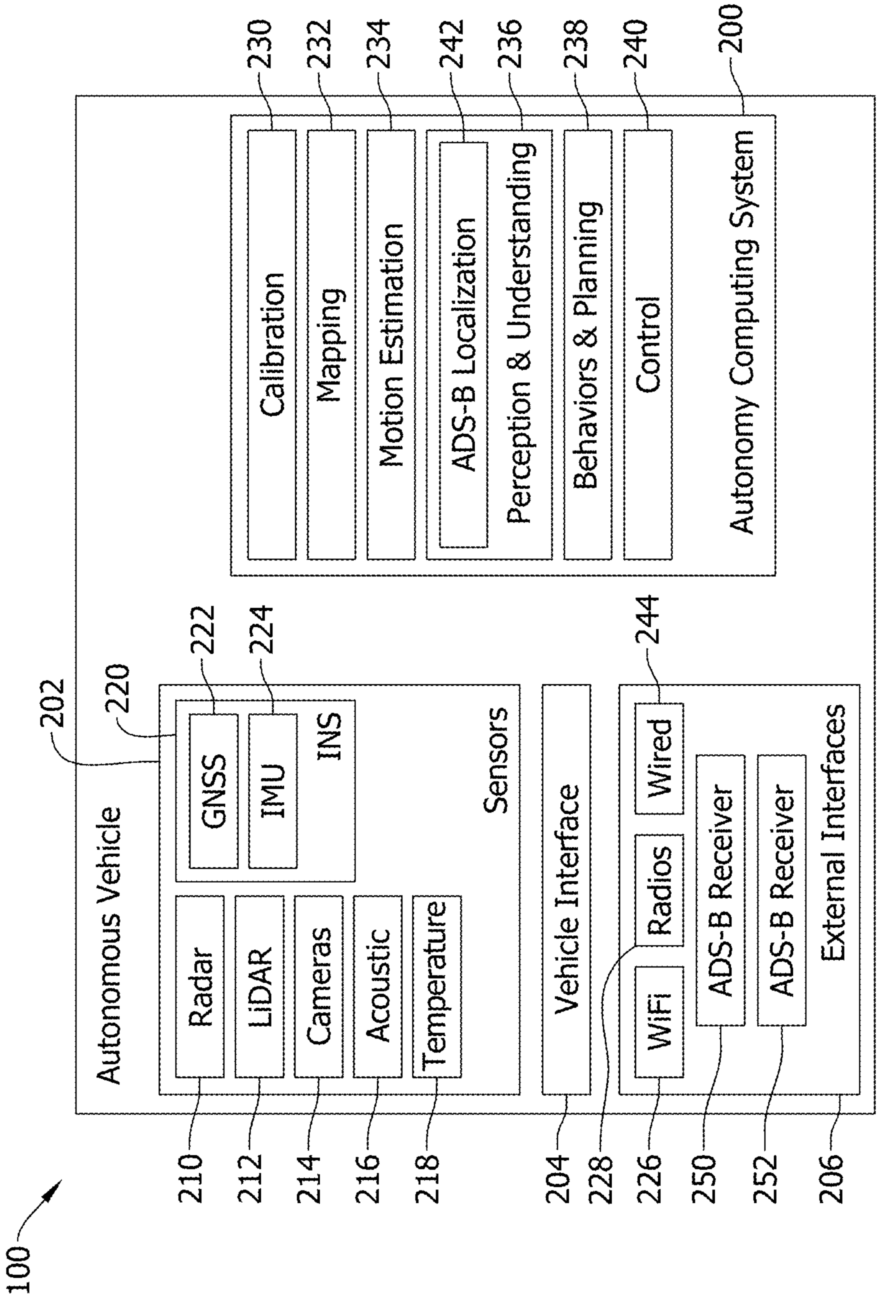
FIG. 2 is a block diagram of the autonomous truck shown in FIG. 1.

FIG. 2 is a block diagram of autonomous vehicle 100 shown in FIG. 1. In the example embodiment, autonomous vehicle 100 includes autonomy computing system 200, sensors 202, a vehicle interface 204, and external interfaces 206.

In the example embodiment, sensors 202 may include various sensors such as, for example, radio detection and ranging (RADAR) sensors 210, light detection and ranging (LiDAR) sensors 212, cameras 214, acoustic sensors 216, temperature sensors 218, or inertial navigation system (INS) 220, which may include one or more global navigation satellite system (GNSS) receivers 222 and one or more inertial measurement units (IMU) 224. Other sensors 202 not shown in FIG. 2 may include, for example, acoustic (e.g., ultrasound), internal vehicle sensors, meteorological sensors, or other types of sensors. Sensors 202 generate respective output signals based on detected physical conditions of autonomous vehicle 100 and its proximity. As described in further detail below, these signals may be used by autonomy computing system 200 to determine how to control operations of autonomous vehicle 100.

Cameras 214 are configured to capture images of the environment surrounding autonomous vehicle 100 in any aspect or field of view (FOV). The FOV can have any angle or aspect such that images of the areas ahead of, to the side, behind, above, or below autonomous vehicle 100 may be captured. In some embodiments, the FOV may be limited to particular areas around autonomous vehicle 100 (e.g., forward of autonomous vehicle 100, to the sides of autonomous vehicle 100, etc.) or may surround 360 degrees of autonomous vehicle 100. In some embodiments, autonomous vehicle 100 includes multiple cameras 214, and the images from each of the multiple cameras 214 may be processed to identify one or more construction markers or other objects in the environment surrounding autonomous vehicle 100. In some embodiments, the image data generated by cameras 214 may be sent to autonomy computing system 200 or other aspects of autonomous vehicle 100 or a hub or both.

LiDAR sensors 212 generally include a laser generator and a detector that send and receive a LiDAR signal such that LiDAR point clouds (or "LiDAR images") of the areas ahead of, to the side, behind, above, or below autonomous vehicle 100 can be captured and represented in the LiDAR point clouds. RADAR sensors 210 may include short-range RADAR (SRR), mid-range RADAR (MRR), long-range RADAR (LRR), or ground-penetrating RADAR (GPR). One or more sensors may emit radio waves, and a processor may process received reflected data (e.g., raw RADAR sensor data) from the emitted radio waves. In some embodiments, the system inputs from cameras 214, RADAR sensors 210, or LiDAR sensors 212 may be used in combination to identify one or more construction markers (or nodes) around autonomous vehicle 100.

GNSS receiver 222 is positioned on autonomous vehicle 100 and may be configured to determine a location of autonomous vehicle 100, which it may embody as GNSS data. GNSS receiver 222 may be configured to receive one or more signals from a global navigation satellite system (e.g., Global Positioning System (GPS) constellation) to localize autonomous vehicle 100 via geolocation. In some embodiments, GNSS receiver 222 may provide an input to or be configured to interact with, update, or otherwise utilize one or more digital maps, such as an HD map (e.g., in a raster layer or other semantic map). In some embodiments, GNSS receiver 222 may provide direct velocity measurement via inspection of the Doppler effect on the signal carrier wave. Multiple GNSS receivers 222 may also provide direct measurements of the orientation of autonomous vehicle 100. For example, with two GNSS receivers 222, two attitude angles (e.g., roll and yaw) may be measured or determined. In some embodiments, autonomous vehicle 100 is configured to receive updates from an external network (e.g., a cellular network). The updates may include one or more of position data (e.g., serving as an alternative or supplement to GNSS data), speed/direction data, orientation or attitude data, traffic data, weather data, or other types of data about autonomous vehicle 100 and its environment.

IMU 224 is a micro-electrical-mechanical (MEMS) device that measures and reports one or more features regarding the motion of autonomous vehicle 100, although other implementations are contemplated, such as mechanical, fiber-optic gyro (FOG), or FOG-on-chip (SiFOG) devices. IMU 224 may measure an acceleration, angular rate, or an orientation of autonomous vehicle 100 or one or more of its individual components using a combination of accelerometers, gyroscopes, or magnetometers. IMU 224 may detect linear acceleration using one or more accelerometers and rotational rate using one or more gyroscopes and attitude information from one or more magnetometers. In some embodiments, IMU 224 may be communicatively coupled to one or more other systems, for example, GNSS receiver 222 and may provide input to and receive output from GNSS receiver 222 such that autonomy computing system 200 is able to determine the motive characteristics (acceleration, speed/direction, orientation/attitude, etc.) of autonomous vehicle 100.

In the example embodiment, autonomy computing system 200 employs vehicle interface 204 to send commands to the various aspects of autonomous vehicle 100 that actually control the motion of autonomous vehicle 100 (e.g., engine, throttle, steering wheel, brakes, etc.) and to receive input data from one or more sensors 202 (e.g., internal sensors). External interfaces 206 are configured to enable autonomous vehicle 100 to communicate with an external network via, for example, a wired or wireless connection, such as Wi-Fi 226 or other radios 228. In embodiments including a wireless connection, the connection may be a wireless communication signal (e.g., Wi-Fi, cellular, LTE, 5G, Bluetooth, etc.).

In some embodiments, external interfaces 206 may be configured to communicate with an external network via a wired connection 244, such as, for example, during testing of autonomous vehicle 100 or when downloading mission data after completion of a trip. The connection(s) may be used to download and install various lines of code in the form of digital files (e.g., HD maps), executable programs (e.g., navigation programs), and other computer-readable code that may be used by autonomous vehicle 100 to navigate or otherwise operate, either autonomously or semi-autonomously. The digital files, executable programs, and other computer readable code may be stored locally or remotely and may be routinely updated (e.g., automatically, or manually) via external interfaces 206 or updated on demand. In some embodiments, autonomous vehicle 100 may deploy with all of the data it needs to complete a mission (e.g., perception, localization, and mission planning) and may not utilize a wireless connection or other connections while underway.

In some embodiments, external interfaces 206 include a first ADS-B radio receiver 250 and a second ADS-B radio receiver 252 to receive ADS-B radio signals. The first ADS-B radio receiver 250 is configured to receive ADS-B radio signals transmitted at 1090 MHz by aircraft operating above 18000 feet using 1090 MHz Extended Squitter (Esq), and the second ADS-B radio receiver 252 is configured to receive ADS-B radio signals transmitted at 978 MHz by aircraft operating below 18000 feet using 978 MHz universal access transceiver (UAT). The first ADS-B radio receiver 250, the second ADS-B radio receiver 252, or both are located on a body of autonomous vehicle 100 or disposed within autonomous vehicle 100.

In the example embodiment, autonomy computing system 200 is implemented by one or more processors and memory devices of autonomous vehicle 100. Autonomy computing system 200 includes modules, which may be hardware components (e.g., processors or other circuits) or software components (e.g., computer applications or processes executable by autonomy computing system 200), configured to generate outputs, such as control signals, based on inputs received from, for example, sensors 202. These modules may include, for example, a calibration module 230, a mapping module 232, a motion estimation module 234, a perception and understanding module 236, a behaviors and planning module 238, a control module or controller 240, and an ADS-B localization module 242. The ADS-B localization module 242, for example, may be embodied within another module, such as behaviors and planning module 238, perception and understanding module 236, or separately. These modules may be implemented in dedicated hardware such as, for example, an application specific integrated circuit (ASIC), field programmable gate array (FPGA), or microprocessor, or implemented as executable software modules, or firmware, written to memory and executed on one or more processors onboard autonomous vehicle 100.

The ADS-B localization module 242 determines a current location of autonomous vehicle 100 based upon ADS-B radio signals received by the first ADS-B radio receiver 250 and the second ADS-B radio receiver 252, and generates a map with the current location of autonomous vehicle 100 on the generated map.

Figure 3:
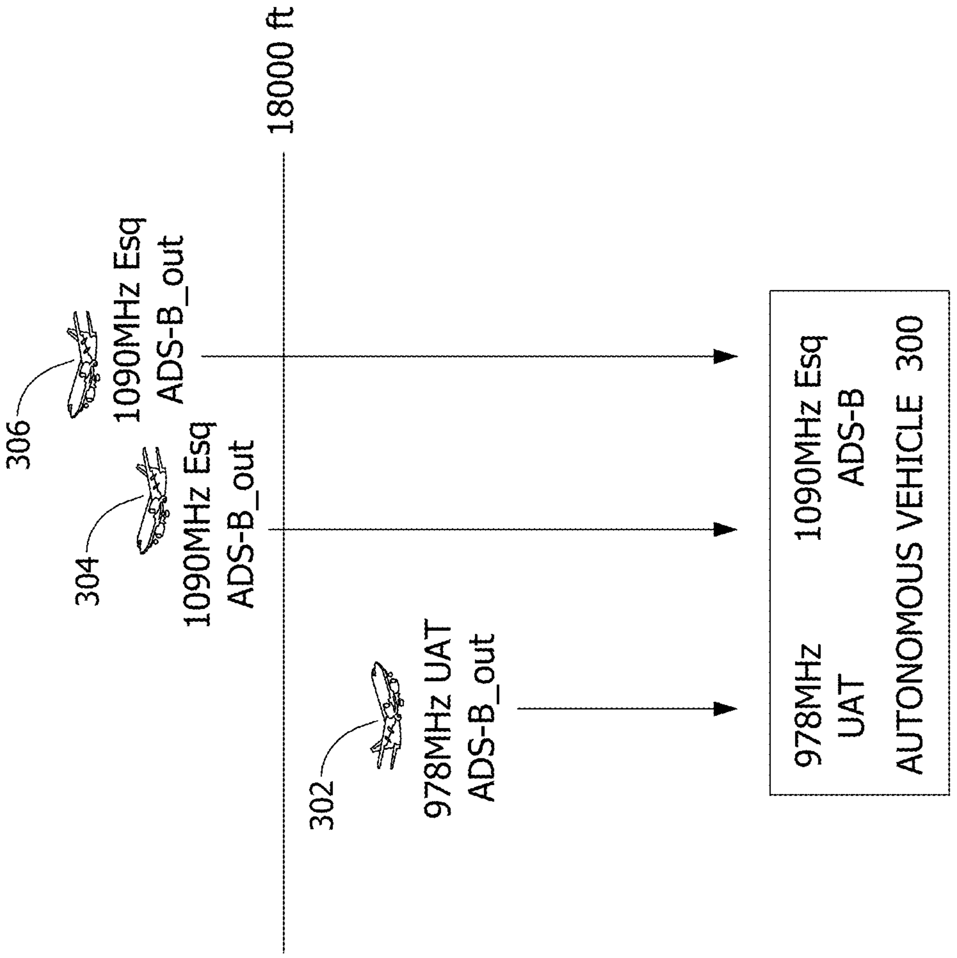
FIG. 3 is an example illustration of localization of an autonomous vehicle using ADS-B radio signals transmitted by a plurality of overhead aircraft.

FIG. 3 is an example illustration of localization of an autonomous vehicle using ADS-B radio signals transmitted by a plurality of overhead aircraft. As shown in FIG. 3, localization of autonomous vehicle 300 is performed using at least three overhead aircraft 302, 304, and 306. One or more of the aircraft 302, 304, and 306 may be flying at or above 18000 feet, and periodically (e.g., at every 1 second) transmit ADS-B radio signal at 1090 MHz through an onboard transmitter. Additionally, or alternatively, one or more of the aircraft 302, 304, and 306 may be flying below 18000 feet, and periodically (e.g., at every 1 second) transmit ADS-B radio signal at 978 MHz through an onboard transmitter.

The ADS-B radio signal includes information, such as current position, altitude and velocity of the aircraft along with an identification of the aircraft. The ADS-B radio signal includes real-time aircraft position information that is more accurate than the position information of the aircraft that is determined using RADAR sensors and is therefore used to determine the position of the aircraft relative to autonomous vehicle 300. For localization of autonomous vehicle 300, all available ADS-B radio signals can be used. However, using just a subset of the available ADS-B radio signals (for example, ADS-B radio signals transmitted by at least three overhead aircraft 302, 304, and 306) may be used for the localization function of autonomous vehicle 300.

In some embodiments, the first ADS-B radio receiver 250 or the second ADS-B radio receiver 252, or both, includes an array of directional radio signal receivers. Alternatively, the first ADS-B radio receiver 250 or the second ADS-B radio receiver 252, or both, includes a receiver with Doppler tracking on the carrier wave. Based upon the radio signals received at the first ADS-B radio receiver 250 or the second ADS-B radio receiver 252, the ADS-B localization module 242 computes an angle from the radio receiver 250 or 252 to a transmission source (an overhead aircraft 302, 304, or 306 transmitting the ADS-B radio signal) with reference to a tangent at the Earth surface at the radio receiver 250 or 252, based upon a phase difference change between the ADS-B radio signal received at different radio receivers of the array of radio signal receivers. Both the ADS-B radio signal transmitter and the ADS-B radio signal receiver are time synchronized using GPS. Accordingly, a distance between the radio receiver 250 or 252 to the transmission source 302, 304, or 306 is computed by the ADS-B localization module 242 based upon a difference in time between the transmission time of the ADS-B radio signal that is included in the ADS-B radio signal and the reception time of the ADS-B radio signal at the radio receiver, and based upon a velocity of the aircraft 302, 304, or 306. A phase shift in the carrier wave of the ADS-B radio signal is used by the ADS-B localization module 242 to compute the aircraft's motion relative to autonomous vehicle 300 using the Doppler effect. As described herein, the aircraft's precise location is known from the received ADS-B radio message, and, therefore, with any of the additional data, including but not limited to, an angle, a distance, and a relative motion of at least three aircraft respective to autonomous vehicle 300, localization of autonomous vehicle 300 is performed using a triangulation algorithm or a mulltilateration algorithm. The multilateration algorithm used for localization of autonomous vehicle 300 is based on ADS-B radio signals transmitted by moving overhead aircraft and received by autonomous vehicle 300, while the autonomous vehicle 300 is in motion or stopped, based upon the computed relative motion and the position information (e.g., three-dimensional location information) of the aircraft transmitting the ADS-B radio signal.

An example pseudo-code is provided below.

```
seen_airplanes = { }
class airplane_information( ):
  def_init_(self, id, location, angle, timestamp):
    self.id = id
    self.location = location # location of the airplane
    self.angle = angle   # angle to the plane
    self.timestamp = timestamp
# receivedNewData is called on receipt of a new ADS-B message
def receivedNewData(new_data : airplane_information):
  seen_airplanes[new_data.id] = new_data
```

-continued

```
# localize( ) is called at a set frequency, such as 1 Hz, to recalculate
the position of the autonomous vehicle
  def localize( ):
    clearOldData( )
    if lane(seen_airplanes) > 2:
      p1, p2, p3 = getMostRecent( )
      p1 = seen_airplanes[0]
      p2 = seen_airplanes[1]
      truck_x = ((p1.location.y − p2.location.y) + (p2.location.x *
math.tan(p2.angle)) − (p1.location.x * math.tan(p1.angle)) ) /
(math.tan(p2.angle) − math.tan(p1.angle))
      truck_y = ( (p1.location.y * math.tan(p1.angle) −
p2.location.y*math.tan(p2.angle)) − ((p1.location.x −
p2.location.x)*math.tan(p2.angle)*math.tan(p1.angle)) ) /
(math.tan(p2.angle) − math.tan(p1.angle))
      truck_angle = math.atan2(p3.location.y − truck_y,
p3.location.x − truck_x)
      return truck_x, truck_y, truck_angle
    else:
      # not enough data
      return None
```

Figure 4:
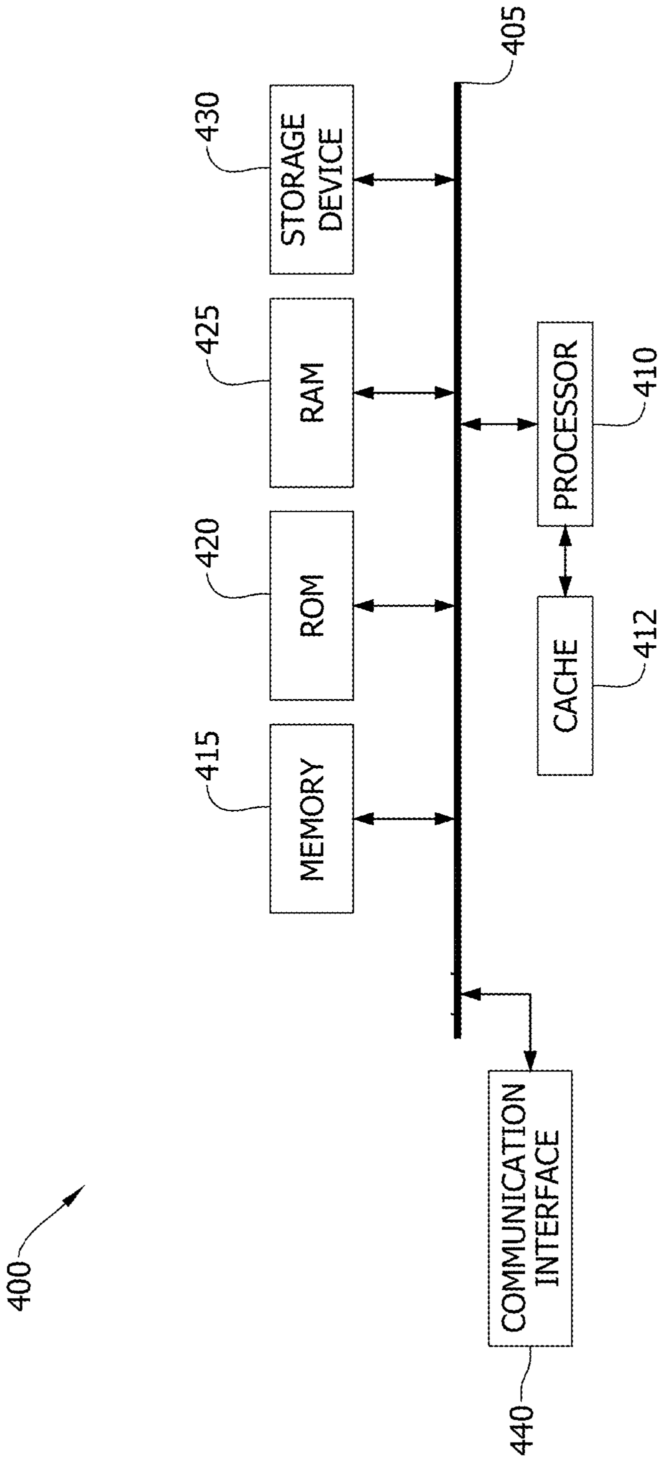
FIG. 4 is a block diagram of an example computing system.

FIG. 4 illustrates an example computing system 400 that can implement various techniques, processes, functions, or methods described herein. The components of computing system 400 are shown in electrical communication with each other using a connection 405, such as a bus. The example computing system 400 includes a processing unit (CPU or processor) 410 and a computing device connection 405 that couples various computing device components, including computing device memory 415, such as a read only memory (ROM) 420 and a random-access memory (RAM) 425, and communication interface 440 to processor 410.

The communication interface 440 may include one or more of a radio interface, an electronic sign board mounted on autonomous vehicle 100, a public address system or a loudspeaker positioned at autonomous vehicle 100. The radio interface may be configured for at least one of: (i) a vehicle-to-vehicle communication technique, (ii) citizens band radio frequencies; (iii) a Bluetooth signal; (iv) Wi-Fi; and (v) a short message service (SMS) technology.

Computing system 400 can include a cache 412 of high-speed memory connected directly with, in close proximity to, or integrated as part of processor 410. Computing system 400 can copy data from memory 415 and/or storage device 430 to cache 412 for quick access by processor 410. In this way, cache 412 can provide a performance boost that avoids processor 410 delays while waiting for data. These and other modules can control or be configured to control processor 410 to perform various actions. Other computing device memory 415 may be available for use as well. Memory 415 can include multiple different types of memory with different performance characteristics. Processor 410 can include any general-purpose processor, central processing unit (CPU), or graphics processing unit (GPU) in combination with a hardware or software provision configured to control processor 410 and stored in storage device 430, as well as any special-purpose processor where software instructions are incorporated into the processor design. Processor 410 may be a self-contained system, containing multiple cores or processors, a bus, memory controller, cache, etc. A multi-core processor may be symmetric or asymmetric.

Storage device 430 is a non-volatile memory and can be one or more of a hard disk or other types of computer readable media that can store data that are accessible by a computer, such as a magnetic cassette, flash memory card, solid state memory device, digital versatile disk, cartridge, RAM 425, ROM 420, or hybrids thereof. Memory 415 or storage device 430 can include software, code, firmware, etc., for controlling processor 410. Other hardware or software modules are contemplated. Memory 415 and storage device 430 are connected to computing device connection 405. In one aspect, a hardware module that performs a particular function can include the software component stored in a computer-readable medium in connection with the necessary hardware components, such as processor 410, computing device connection 405, and so forth, to carry out the function. In the example embodiment, processor 410 may be programmed by encoding an operation or function using one or more executable instructions and providing the executable instructions in memory 415 or storage device 430.

In operation, a computer executes computer-executable instructions embodied in one or more computer-executable components stored on one or more computer-readable media to implement aspects of the disclosure described or illustrated herein. The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

Figure 5:
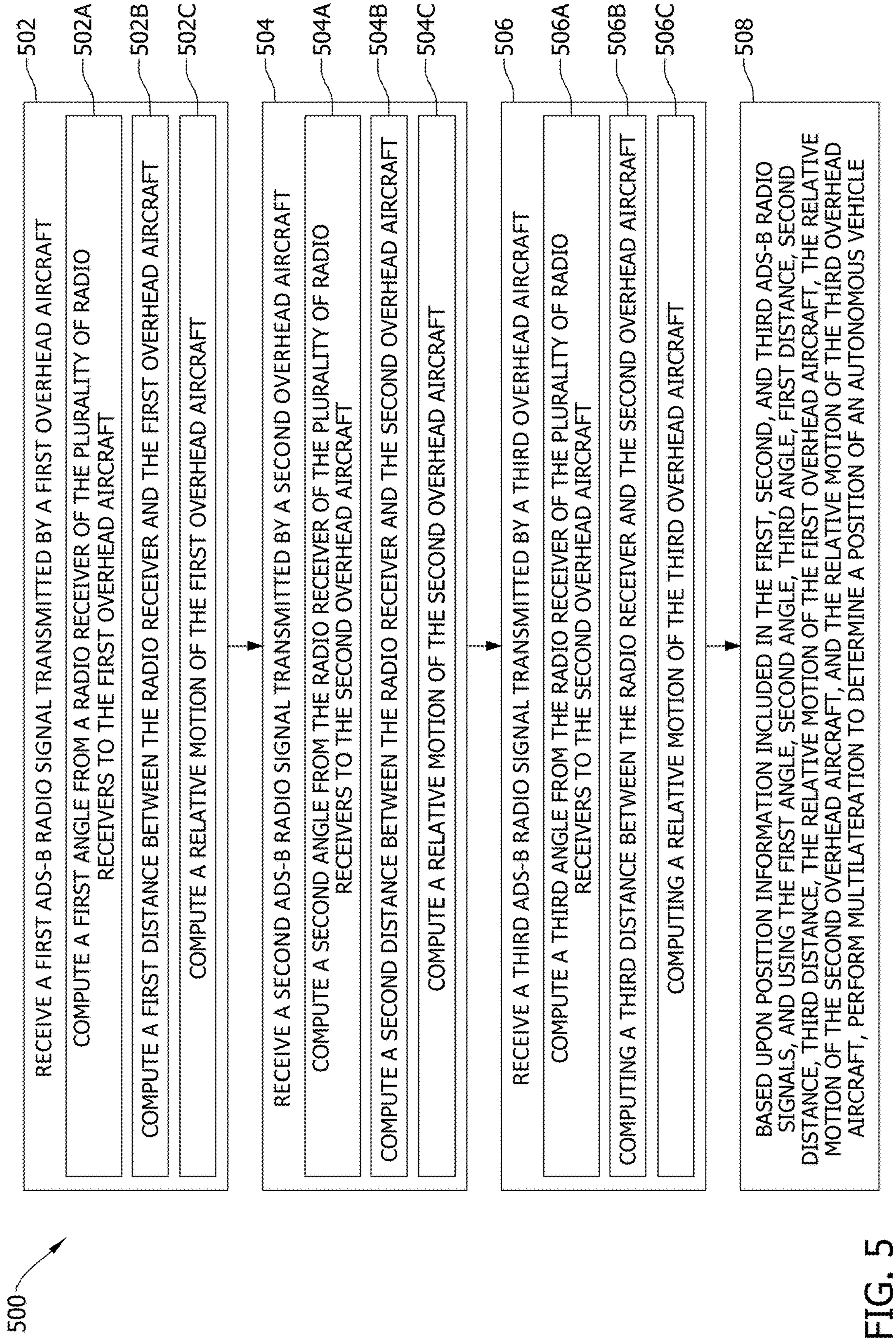
FIG. 5 is an example flow-chart of method operations for localization of a vehicle using ADS-B radio signals transmitted by a plurality of overhead aircraft.

FIG. 5 is an example flow-chart 500 of method operations for localization of a vehicle using ADS-B radio signals transmitted by a plurality of overhead aircraft. While embodiments are described herein with reference to an autonomous vehicle, but the embodiments are not limited to an autonomous vehicle alone but can be used for localization of any type of vehicle, or a watercraft (e.g., a boat).

The method operations include receiving 502 a first ADS-B radio signal transmitted by a first overhead aircraft of the plurality of overhead aircraft. The first ADS-B radio signal may be transmitted by the first overhead aircraft at 1090 MHz or 978 MHz depending upon an altitude at which the first overhead aircraft is flying. As described herein, if the first overhead aircraft is flying at 18000 feet or above, the first ADS-B radio signal may be transmitted at 1090 MHz, and if the first overhead aircraft is flying below 18000 feet, the first ADS-B radio signal may be transmitted at 978 MHz. The first ADS-B radio signal includes position information, for example, a three-dimensional position, of the first overhead aircraft.

The method operations include computing **502*a* a first angle from a radio receiver of the plurality of radio receivers to the first overhead aircraft, computing 502*b* a first distance between the radio receiver and the first overhead aircraft, and computing 502*c*** a relative motion of the first overhead aircraft. By way of a non-limiting example, the first angle is computed based upon a difference in phase change of the first ADS-B radio signal received at two or more radio receivers of the plurality of radio receivers. Further, the first distance is computed based upon velocity information included in the first ADS-B radio signal and a difference in time between receipt and transmission of the first ADS-B radio signal, and the relative motion of the first overhead aircraft is computed based upon a phase shift in a carrier wave of the first ADS-B radio signal using Doppler effect.

The method operations include receiving 504 a second ADS-B radio signal transmitted by a second overhead aircraft of the plurality of overhead aircraft. The second ADS-B radio signal may be transmitted by the second overhead aircraft at 1090 MHz or 978 MHz depending upon an altitude at which the second overhead aircraft is flying. As described herein, if the second overhead aircraft is flying at 18000 feet or above, the second ADS-B radio signal may be transmitted at 1090 MHz, and if the second overhead aircraft is flying below 18000 feet, the second ADS-B radio signal may be transmitted at 978 MHz. The second ADS-B radio signal includes position information, for example, a three-dimensional position, of the second overhead aircraft.

The method operations include computing 504*a* a second angle from a radio receiver of the plurality of radio receivers to the second overhead aircraft, computing 504*b* a second distance between the radio receiver and the second overhead aircraft, and computing 504*c* a relative motion of the second overhead aircraft. By way of a non-limiting example, the second angle is computed based upon a difference in phase change of the second ADS-B radio signal received at two or more radio receivers of the plurality of radio receivers. Further, the second distance is computed based upon velocity information included in the second ADS-B radio signal and a difference in time between receipt and transmission of the second ADS-B radio signal, and the relative motion of the second overhead aircraft is computed based upon a phase shift in a carrier wave of the second ADS-B radio signal using Doppler effect.

The method operations include receiving 506 a third ADS-B radio signal transmitted by a third overhead aircraft of the plurality of overhead aircraft. The third ADS-B radio signal may be transmitted by the third overhead aircraft at 1090 MHz or 978 MHz depending upon an altitude at which the third overhead aircraft is flying. As described herein, if the third overhead aircraft is flying at 18000 feet or above, the third ADS-B radio signal may be transmitted at 1090 MHz, and if the third overhead aircraft is flying below 18000 feet, the third ADS-B radio signal may be transmitted at 978 MHz. The third ADS-B radio signal includes position information, for example, a three-dimensional position, of the third overhead aircraft.

The method operations include computing 506*a* a third angle from a radio receiver of the plurality of radio receivers to the third overhead aircraft, computing 506*b* a third distance between the radio receiver and the third overhead aircraft, and computing 506*c* a relative motion of the third overhead aircraft. By way of a non-limiting example, the third angle is computed based upon a difference in phase change of the third ADS-B radio signal received at two or more radio receivers of the plurality of radio receivers. Further, the third distance is computed based upon velocity information included in the third ADS-B radio signal and a difference in time between receipt and transmission of the third ADS-B radio signal, and the relative motion of the third overhead aircraft is computed based upon a phase shift in a carrier wave of the third ADS-B radio signal using Doppler effect.

The method operations include, based upon position information included in the first, second, and third ADS-B radio signals, and using the first angle, second angle, third angle, first distance, second distance, third distance, the relative motion of the first overhead aircraft, the relative motion of the second overhead aircraft, and the relative motion of the third overhead aircraft, performing 508 multilateration to determine a position of the autonomous vehicle. Since the details of performing 508 multilateration is described in detail herein, those details are not repeated herein for brevity.

An example technical effect of the methods, systems, and apparatus described herein includes at least improving accuracy of localization of an autonomous vehicle in comparison to localization of the autonomous vehicle using GNSS.

Some embodiments involve the use of one or more electronic processing or computing devices. As used herein, the terms "processor" and "computer" and related terms, e.g., "processing device," and "computing device" are not limited to just those integrated circuits referred to in the art as a computer, but broadly refers to a processor, a processing device or system, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processor (DSP), an application specific integrated circuit (ASIC), and other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the terms processor, processing device, and related terms.

The various aspects illustrated by logical blocks, modules, circuits, processes, algorithms, and algorithm steps described above may be implemented as electronic hardware, software, or combinations of both. Certain disclosed components, blocks, modules, circuits, and steps are described in terms of their functionality, illustrating the interchangeability of their implementation in electronic hardware or software. The implementation of such functionality varies among different applications given varying system architectures and design constraints. Although such implementations may vary from application to application, they do not constitute a departure from the scope of this disclosure.

Aspects of embodiments implemented in software may be implemented in program code, application software, application programming interfaces (APIs), firmware, middleware, microcode, hardware description languages (HDLs), or any combination thereof. A code segment or machine-executable instruction may represent a procedure, a function, a subprogram, a program, a routine, a subroutine, a module, a software package, a class, or any combination of instructions, data structures, or program statements. A code segment may be coupled to, or integrated with, another code segment or an electronic hardware by passing or receiving information, data, arguments, parameters, memory contents, or memory locations. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the disclosed functions may be embodied, or stored, as one or more instructions or code on or in memory. In the embodiments described herein, memory includes non-transitory computer-readable media, which may include, but is not limited to, media such as flash memory, a random-access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary" or "example" embodiment are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein, including the implementation or utilization of components of the systems or steps independently and separately from other described components or steps. Therefore, it is manifestly intended that embodiments described herein be limited only by the claims.

What is claimed is:

1. A system for localization of an autonomous vehicle including:
- a plurality of radio receivers configured to receive automatic dependent surveillance-broadcast (ADS-B) radio signals transmitted by a plurality of overhead aircraft, wherein the plurality of radio receivers is positioned on a body of the autonomous vehicle;
- at least one memory configured to store instructions; and
- at least one processor communicatively coupled to the at least one memory and configured to execute the stored instructions to perform operations comprising:
  - based upon a first ADS-B radio signal transmitted by a first overhead aircraft of the plurality of overhead aircraft,
    - computing a first angle from a radio receiver of the plurality of radio receivers to the first overhead aircraft,
    - computing a first distance between the radio receiver and the first overhead aircraft, and
    - computing a relative motion of the first overhead aircraft;
  - based upon a second ADS-B radio signal transmitted by a second overhead aircraft of the plurality of overhead aircraft,
    - computing a second angle from the radio receiver of the plurality of radio receivers to the second overhead aircraft,
    - computing a second distance between the radio receiver and the second overhead aircraft, and
    - computing a relative motion of the second overhead aircraft;
  - based upon a third ADS-B radio signal transmitted by a third overhead aircraft of the plurality of overhead aircraft,
    - computing a third angle from the radio receiver of the plurality of radio receivers to the second overhead aircraft,
    - computing a third distance between the radio receiver and the second overhead aircraft, and
    - computing a relative motion of the third overhead aircraft; and
  - based upon position information included in the first, second, and third ADS-B radio signals, and using the first angle, second angle, third angle, first distance, second distance, third distance, the relative motion of the first overhead aircraft, the relative motion of the second overhead aircraft, and the relative motion of the third overhead aircraft, performing multilateration to determine a position of the autonomous vehicle.

2. The system of claim 1, wherein at least one radio receiver of the plurality of radio receivers is configured to receive ADS-B radio signals transmitted at 1090 MHz.

3. The system of claim 1, wherein at least one radio receiver of the plurality of radio receivers is configured to receive ADS-B radio signals transmitted at 978 MHz.

4. The system of claim 1, wherein each of the plurality of radio receivers is configured to track Doppler shift on a carrier wave of the ADS-B radio signals.

5. The system of claim 1, wherein the first distance, the second distance, or the third distance is computed based upon velocity information included in the first ADS-B radio signal, the second ADS-B radio signal, or the third ADS-B radio signal, respectively, and a difference in time between receipt and transmission of the first ADS-B radio signal, the second ADS-B radio signal, or the third ADS-B radio signal, respectively.

6. The system of claim 1, wherein the first angle, the second angle, or the third angle is computed based upon a difference in phase change of the first ADS-B radio signal, the second ADS-B radio signal, or the third ADS-B radio signal, respectively, received at two or more radio receivers of the plurality of radio receivers.

7. The system of claim 1, wherein the relative motion of the first overhead aircraft, the relative motion of the second overhead aircraft, or the relative motion of the third overhead aircraft is computed based upon a phase shift in a carrier wave of the first ADS-B radio signal, the second ADS-B radio signal, or the third ADS-B radio signal, respectively, using Doppler effect.

8. The system of claim 1, wherein the position information included in the first, second, and third ADS-B radio signals is a three-dimensional position of the first, second, or third overhead aircraft, respectively.

9. The system of claim 1, wherein the position information included in the first, second, and third ADS-B radio signals is a three-dimensional position of the first, second, or third overhead aircraft, respectively.

10. A computer-implemented method for localization of an autonomous vehicle comprising a plurality of radio receivers configured to receive automatic dependent surveillance-broadcast (ADS-B) radio signals transmitted by a plurality of overhead aircraft, the method comprising:

- based upon a first ADS-B radio signal transmitted by a first overhead aircraft of the plurality of overhead aircraft,
  - computing a first angle from a radio receiver of the plurality of radio receivers to the first overhead aircraft,
  - computing a first distance between the radio receiver and the first overhead aircraft, and
  - computing a relative motion of the first overhead aircraft;
- based upon a second ADS-B radio signal transmitted by a second overhead aircraft of the plurality of overhead aircraft,
  - computing a second angle from the radio receiver of the plurality of radio receivers to the second overhead aircraft,
  - computing a second distance between the radio receiver and the second overhead aircraft, and
  - computing a relative motion of the second overhead aircraft;
- based upon a third ADS-B radio signal transmitted by a third overhead aircraft of the plurality of overhead aircraft,
  - computing a third angle from the radio receiver of the plurality of radio receivers to the second overhead aircraft,
  - computing a third distance between the radio receiver and the second overhead aircraft, and
  - computing a relative motion of the third overhead aircraft; and
- based upon position information included in the first, second, and third ADS-B radio signals, and using the first angle, second angle, third angle, first distance, second distance, third distance, the relative motion of the first overhead aircraft, the relative motion of the second overhead aircraft, and the relative motion of the third overhead aircraft, performing multilateration to determine a position of the autonomous vehicle.

11. The computer-implemented method of claim 10, further comprising receiving, by at least one radio receiver of the plurality of radio receivers, ADS-B radio signals transmitted at 1090 MHz.

12. The computer-implemented method of claim 10, further comprising receiving, by at least one radio receiver of the plurality of radio receivers, ADS-B radio signals transmitted at 978 MHz.

13. The computer-implemented method of claim 10, further comprising tracking, by each of the plurality of radio receivers, Doppler shift on a carrier wave of the ADS-B radio signals.

14. The computer-implemented method of claim 10, wherein computing the first distance, the second distance, or the third distance comprises computing the first distance, the second distance, or the third distance based upon velocity information included in the first ADS-B radio signal, the second ADS-B radio signal, or the third ADS-B radio signal, respectively, and a difference in time between receipt and transmission of the first ADS-B radio signal, the second ADS-B radio signal, or the third ADS-B radio signal, respectively.

15. The computer-implemented method of claim 10, wherein computing the first angle, the second angle, or the third angle comprises computing the first angle, the second angle, or the third angle based upon a difference in phase change of the first ADS-B radio signal, the second ADS-B radio signal, or the third ADS-B radio signal, respectively, received at two or more radio receivers of the plurality of radio receivers.

16. The computer-implemented method of claim 10, wherein computing the relative motion of the first overhead aircraft, the relative motion of the second overhead aircraft, or the relative motion of the third overhead aircraft comprises computing the relative motion of the first overhead aircraft, the relative motion of the second overhead aircraft, or the relative motion of the third overhead aircraft based upon a phase shift in a carrier wave of the first ADS-B radio signal, the second ADS-B radio signal, or the third ADS-B radio signal, respectively, using Doppler effect.

17. The computer-implemented method of claim 10, wherein the position information included in the first, second, and third ADS-B radio signals is a three-dimensional position of the first, second, or third overhead aircraft, respectively.

18. An autonomous vehicle including:

- a plurality of radio receivers configured to receive automatic dependent surveillance-broadcast (ADS-B) radio signals transmitted by a plurality of overhead aircraft;
- at least one memory configured to store instructions; and
- at least one processor communicatively coupled to the at least one memory and configured to execute the stored instructions to perform operations comprising:
- based upon a first ADS-B radio signal transmitted by a first overhead aircraft of the plurality of overhead aircraft,
  - computing a first angle from a radio receiver of the plurality of radio receivers to the first overhead aircraft,
  - computing a first distance between the radio receiver and the first overhead aircraft, and
  - computing a relative motion of the first overhead aircraft;
- based upon a second ADS-B radio signal transmitted by a second overhead aircraft of the plurality of overhead aircraft,
  - computing a second angle from the radio receiver of the plurality of radio receivers to the second overhead aircraft,
  - computing a second distance between the radio receiver and the second overhead aircraft, and
  - computing a relative motion of the second overhead aircraft;
- based upon a third ADS-B radio signal transmitted by a third overhead aircraft of the plurality of overhead aircraft,
  - computing a third angle from the radio receiver of the plurality of radio receivers to the second overhead aircraft,
  - computing a third distance between the radio receiver and the second overhead aircraft, and computing a relative motion of the third overhead aircraft; and based upon position information included in the first, second, and third ADS-B radio signals, and using the first angle, second angle, third angle, first distance, second distance, third distance, the relative motion of the first overhead aircraft, the relative motion of the second overhead aircraft, and the relative motion of the third overhead aircraft, performing multilateration to determine a position of the autonomous vehicle.

19. The vehicle of claim 18, wherein at least one radio receiver of the plurality of radio receivers is configured to receive ADS-B radio signals transmitted at at least one of: 1090 MHz or 978 MHz, and wherein each of the plurality of radio receivers is configured to track Doppler shift on a carrier wave of the ADS-B radio signals.

20. The vehicle of claim 18, wherein:

the first distance, the second distance, or the third distance is computed based upon velocity information included in the first ADS-B radio signal, the second ADS-B radio signal, or the third ADS-B radio signal, respectively, and a difference in time between receipt and transmission of the first ADS-B radio signal, the second ADS-B radio signal, or the third ADS-B radio signal, respectively;

the first angle, the second angle, or the third angle is computed based upon a difference in phase change of the first ADS-B radio signal, the second ADS-B radio signal, or the third ADS-B radio signal, respectively, received at two or more radio receivers of the plurality of radio receivers; or the relative motion of the first overhead aircraft, the relative motion of the second overhead aircraft, or the relative motion of the third overhead aircraft is computed based upon a phase shift in a carrier wave of the first ADS-B radio signal, the second ADS-B radio signal, or the third ADS-B radio signal, respectively, using Doppler effect.

* * * * *